(12) United States Patent
Mori

(10) Patent No.: US 7,050,705 B1
(45) Date of Patent: May 23, 2006

(54) DATA RECORDING AND REPRODUCING APPARATUS, METHOD FOR RECORDING AND REPRODUCING VIDEO DATA, DISK DRIVE UNIT, AND CONTROL UNIT OF DATA RECORDING AND REPRODUCING APPARATUS

(75) Inventor: Kazuaki Mori, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 09/675,543

(22) Filed: Sep. 28, 2000

(30) Foreign Application Priority Data

Oct. 7, 1999 (JP) ............................................ 11-286850

(51) Int. Cl.
*H04N 5/85* (2006.01)
*H04N 5/91* (2006.01)

(52) U.S. Cl. ........................ 386/125; 386/124; 386/126
(58) Field of Classification Search ................. 386/125, 386/124, 126, 105, 106, 46, 45, 40, 1, 68, 386/77, 82, 92, 95, 35; H04N 5/85, 5/91
See application file for complete search history.

(56) References Cited

U.S. PATENT DOCUMENTS 5,134,499 A * 7/1992 Sata et al. ................... 386/109
6,693,857 B1 * 2/2004 Willis ....................... 369/30.23

FOREIGN PATENT DOCUMENTS

JP 11-110915 4/1999
WO WO 96/33579 10/1996

* cited by examiner

*Primary Examiner*—Robert Chevalier

(74) *Attorney, Agent, or Firm*—Paik Saber; William D. Gill; Dillon & Yudell LLP

(57) ABSTRACT

A data recording and reproducing apparatus of the present invention may be constituted by a hard disk drive, which comprises a magnetic disk, an input buffer positioned on an input path, an output buffer positioned on an output path, and a controller located between the input and output buffers and the magnetic disk. The controller operates to store (record) input data in the input buffer and transfer (reproduce) output data from the output buffer simultaneously, in parallel with reading or writing of the magnetic disk.

12 Claims, 12 Drawing Sheets

| FUNCTION | COMMAND | PARAMETERS | EXPLANATION |
|---|---|---|---|
| INITIALIZATION | INIT | NONE | INITIALIZE ALL |
| CREATION OF FILE | CREATE | FILENAME ADDITIONAL INFORMATION | IN PREPARATION FOR WRITING OF FILE, EMPTY FILE IS PREPARED, AND ADDITIONAL INFORMATION IS STORED IN DIRECTORY |
| DELETION OF FILE | DELETE | FILENAME | SPECIFIED FILE IS DELETED, AND RELEASE STORAGE AREA |
| READING OF FILE | READ | FILENAME POSITION OF STARTING READING | SPECIFIED FILE IS READ FROM SPECIFIED POSITION, AND SENT OUT FROM OUTPUT SYSTEM |
| WRITING OF FILE | WRITE | FILENAME | DATA INPUT FROM INPUT SYSTEM IS STORED IN SPECIFIED FILE |
| CLOSE | CLOSE | FILENAME | READING OR WRITING OF SPECIFIED FILE IS COMPLETED, AND DATA REMAINING IN INPUT BUFFER IS STORED IN CASE OF WRITING |
| DIRECTORY | DIRECTORY | NONE | FILE NAME, SIZE, RECORDING DATE/TIME AND ADDITIONAL INFORMATION ARE RETURNED AS STATUS INFORMATION |

*Fig. 11*

DATA RECORDING AND REPRODUCING APPARATUS, METHOD FOR RECORDING AND REPRODUCING VIDEO DATA, DISK DRIVE UNIT, AND CONTROL UNIT OF DATA RECORDING AND REPRODUCING APPARATUS

BACKGROUND OF THE INVENTION

1. Field of the Invention

The present invention relates to an apparatus and method for recording and reproducing data, which can be applied to a disk drive apparatus, and more particularly to a technology capable of recording video data while reproducing the same or other video data.

2. Background of the Invention

A magnetic tape is a popular recording medium for recording video data such as a TV program and a video cassette recorder (hereinafter referred to as VCR) which records video data onto the magnetic tape has spread very widely. The VCR is used not only to record TV programs but also to replay a video tape on which movies or other programs (hereinafter sometimes referred to as programs including TV programs).

The above described VCRs have the following problems and demands. First, when a plurality of programs are recorded on one video tape, a considerable amount of time is spent for a fast-forward or rewind to search a heading of a program to be reproduced. This is because the magnetic tape is a recording medium which is not suitable for random-accessing. Further, some viewers may want to record a TV program while watching this TV program from a desired point of time, or to record a TV program while watching another TV program previously recorded. Although such desires mean that the viewers want to have a video recorder having a simultaneous recording and reproducing function, conventional VCRs have no such function.

An example of a digital video unit which would be effective for the above described problems is disclosed in Japanese Laid-Open Patent Application No. Hei 11-504175. This digital video unit include a digital video tape recorder and a hard disk drive. In this digital video unit, data is once recorded on a hard disk at the time of data recording, and then the data is transferred and copied to a digital video tape. When the data is to be reproduced, the data recorded on the digital video tape is once recorded on the hard disk, and then transferred to a display. According to the description of Japanese Laid-Open Patent Application No. Hei 11-504175, the random-accessible hard disk is used to realize quick reproducing from any point of a recorded program, and it is possible to reproduce a program recorded on the digital video tape while recording a different program. Accordingly, the digital video unit disclosed in Japanese Laid-Open Patent Application No. Hei 11-504175 may be effective for satisfying the demands of the viewers.

However, the above digital video unit requires two facilities, i.e. a recording and reproducing apparatus for digital video tapes, and a hard disk drive, which results in high cost. Although the digital video unit is functionally superior to analog VCRs widely used, the analog VCR is inexpensive and, therefore, the high cost of the digital video unit obstructs its spread. Consequently, there is a need for an apparatus which is random-accessible and capable of performing simultaneous recording and reproducing with a single recording medium.

SUMMARY OF THE INVENTION

Therefore, an object of the present invention is to provide a data recording and reproducing apparatus which is random-accessible and capable of performing simultaneous recording and reproducing with a single recording medium, and a method therefor.

Another object of the present invention is to provide a disk drive unit suitable for such data recording and reproducing.

From a viewpoint of random-accessing, a hard disk drive is desirable as a recording device for achieving the objects of the present invention. However, owing to that the current hard disk drive shares data input and output paths and has only one magnetic head assembly for reading and writing data, either reading or writing can be done exclusively. This means that the current hard disk drive cannot perform simultaneous recording and reproducing. This is also true for other random-accessible recording devices such as digital video disks (DVDs). Accordingly, in the present invention, simultaneous recording and reproducing is achieved by separately providing data input and output paths which were shared in the conventional random-accessible recording devices, providing input and output buffers, respectively, for the input and output paths separately provided, and performing operations as described later.

Specifically, a data recording and reproducing apparatus of the present invention comprises a random-accessible recording device for storing data; an input path for transferring input data to the recording device; an input buffer disposed on the input path for temporarily storing the input data; an output path for transferring output data stored in the recording device; an output buffer for temporarily storing the output data transferred through the output path; and a controller for simultaneously performing storing of the input data into the input buffer and transferring of the output data from the output buffer, in parallel with writing from the input buffer to the recording device or reading from the recording device to the output buffer.

Although the data recording and reproducing apparatus of the present invention achieves simultaneous recording and reproducing, this does not mean that the recording device can be read and written simultaneously. As a matter of course, if data can be read from and written to the recording device simultaneously, the simultaneous recording and reproducing can be performed. However, a hard disk drive which has only one magnetic head assembly cannot perform the simultaneous reading and writing. For example, although the current hard disk drive can reproduce a program fragmentarily while recording another program fragmentarily, this does not make sense for the normal recording and reproducing. Accordingly, the simultaneous recording and reproducing in the present invention does not mean such fragmentary ones but continuous and simultaneous recording and reproducing of a program or programs. If a plurality of magnetic head assemblies could be provided in the hard disk drive, it might be possible to perform simultaneous reading and writing which would, however, result in a complex structure and higher cost. Therefore, the present invention achieves simultaneous recording and reproducing by utilizing buffers for temporarily storing data even if the recording device per se cannot perform simultaneous reading and writing. Note that the recording device (e.g. hard disk drive) in the data recording and reproducing apparatus of the present invention stores data, and is different from a hard disk drive disclosed in Japanese Patent Laid-Open No. Hei 11-504175, which is used as a buffer.

In the data recording and reproducing apparatus of the present invention, the input and output buffers may be the ones having a First in First out (hereinafter referred to as FiFo) function each of which desirably has two memory areas so that each buffer functions as a double buffer. Assuming that $t_1$ is a time required for writing data into the recording device the amount of which is sufficient to fill the first or second memory area of the input buffer, $T_1$ is a time required for filling the first or second memory area of the input buffer with data, $t_2$ is a time required for reading out data from the recording device the amount of which is sufficient to fill the first or second memory area of the output buffer, and $T_2$ is a time required for outputting all of the data filled in the first or second memory area of the output buffer, if $t_1+t_2<T_1$ and $t_1+t_2<T_2$ are satisfied, the simultaneous recording and reproducing can be done.

Furthermore, in the data recording and reproducing apparatus of the present invention, a path used for command input and status output (hereinafter referred to as a command input/status output path) can be connected thereto. This command input/status output path is provided separately from the input path and the output path. Therefore, the command input or status output does not interrupt the data input or data output. In other words, it is possible to ensure the simultaneous recording and reproducing of continuous video data.

The data recording and reproducing apparatus of the present invention uses a random-accessible recording device such as a hard disk, and provides respectively data input and output buffers on input and output paths which are provided independently from each other, thus enabling the simultaneous recording and reproducing which continuously records video data onto a recording medium while reproducing the video data continuously. A method of the simultaneous recording and reproducing will be described below.

The method of the simultaneous recording and reproducing premises that a path for recording video data and a path for reproducing the video data exist independently from each other. The reason of this is as follows. If a common or shared path is used for recording and reproducing video data, the path cannot transfer video data to be reproduced while the path is being used for recording video data, or the path cannot transfer video data to be recorded while the path is being used for reproducing video data. Accordingly, this makes it impossible to perform the simultaneous recording and reproducing. In the present invention, the input buffer and the output buffer are respectively provided on the separate input and output paths.

With the above premise, the method of the present invention comprises the steps of storing external video data into an input buffer, recording the video data stored in the input buffer to a recording device, reading the video data recorded in the recording device to an output buffer, and transferring the video data read out to the output buffer to the outside, the last step being executed simultaneously with the storing step.

It is desirable that each of the input buffer and the output buffer has two separate memory areas as described above. Thus, the present invention has made it possible to continuously record video data while continuously reproducing video data by utilizing the input and output buffers and by controlling the reading and writing of the video data. In the method of recording and reproducing video data according to the present invention, the video data continuously reproduced and the video data continuously recorded may be the same program, or they may be different programs.

The data recording and reproducing apparatus of the present invention can be provided as a disk drive unit. That is, according to the present invention, a disk drive unit is provided, which comprises a hard disk for storing data; an input path for transferring input data to the hard disk; an output path for transferring the data stored in said hard disk, the output path being separate from the input path; and a file system disposed between the input and output paths and the recording device for managing the data stored in the hard disk. Since this disk drive unit is provided with the file system for managing the data stored in the hard disk, reading data from and writing data to the hard disk which are required for the simultaneous recording and reproducing can be performed quickly.

In the above disk drive unit, an input buffer is disposed on the input path, an output buffer is disposed on the output path, a controller for controlling the input buffer and the output buffer is provided between the input and output buffers and the hard disk, and the file system is built in the controller, to thereby improve the function of the disk drive unit.

Additionally, the data recording and reproducing apparatus of the present invention can be provided in a form in which the random-accessible recording device (e.g. hard disk), the input and output buffers and the controller are integrated, or can be provided in a unified form excluding the recording device. In other words, the present invention provides a control unit for a data recording and reproducing apparatus, which comprises an input buffer for temporarily storing data to be stored in a random-accessible recording device; an output buffer for temporarily storing data stored in the recording device upon transferring the data; and a controller which controls storing data into and outputting data from the input buffer and the output buffer and has a file system function for managing the data stored in the recording device.

The data recording and reproducing apparatus of the present invention can be applied to a digital video recorder system for TV broadcast. In the case where the TV broadcast is analog, a tuner for receiving broadcast waves, means for digitizing analog video data received by the tuner and for compressing the digital video data, and means for expanding and converting to an analog form the data transferred from the data recording and reproducing apparatus of the present invention should be provided. In the case where the TV broadcast is digital, the compressing means is not required because compressed digital video signals are received.

BRIEF DESCRIPTIONS OF THE DRAWINGS

FIG. 11 depicts a diagram showing a list of commands supplied to the controller 14 from a command input/status output path 13.

PREFERRED EMBODIMENTS OF THE INVENTION

Embodiments of the present invention will be described with reference to the accompanying drawings.

Figure 1:
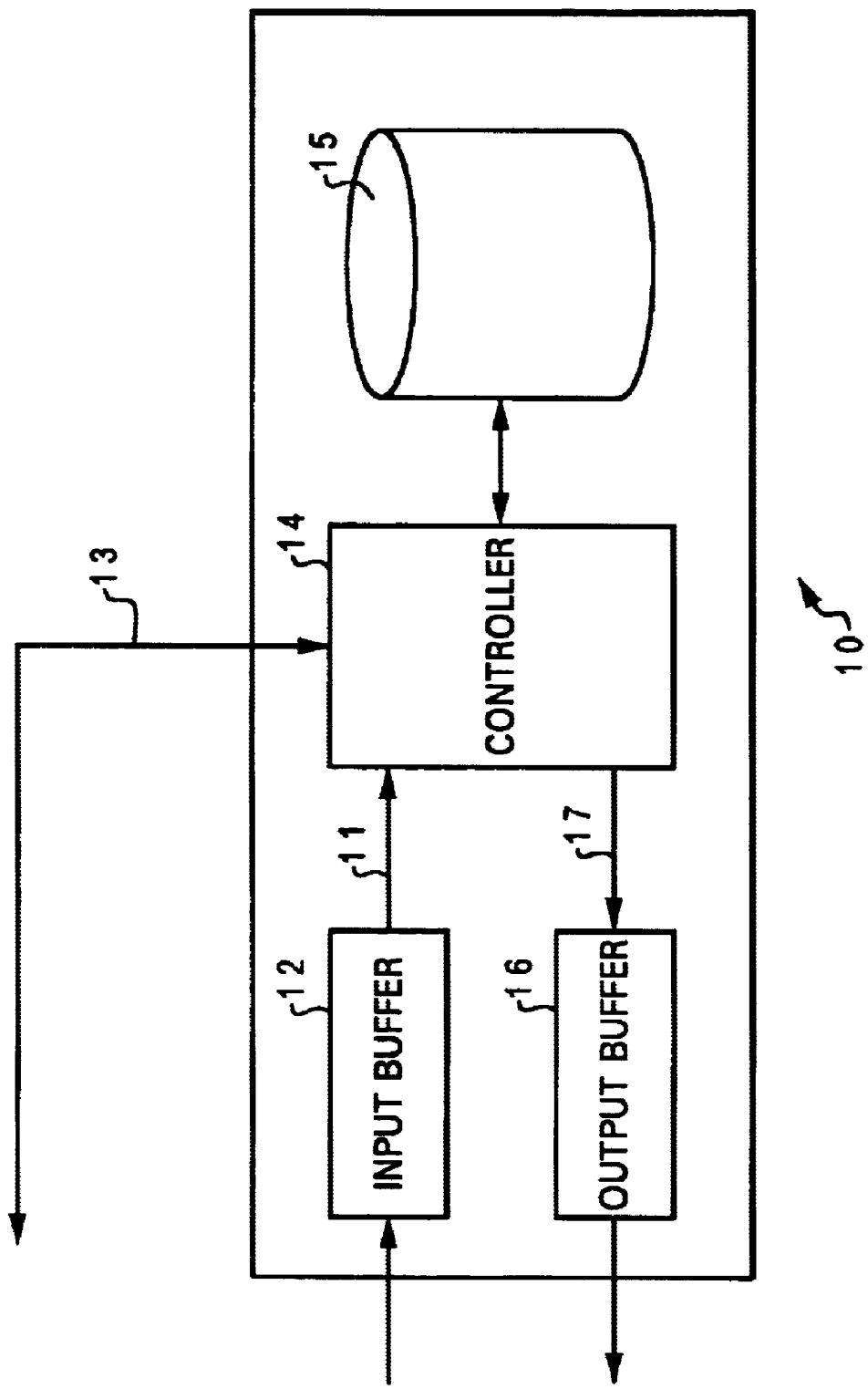
FIG. 1 depicts a block diagram showing a data recording and reproducing apparatus according to an embodiment of the present invention.
Figure 2:
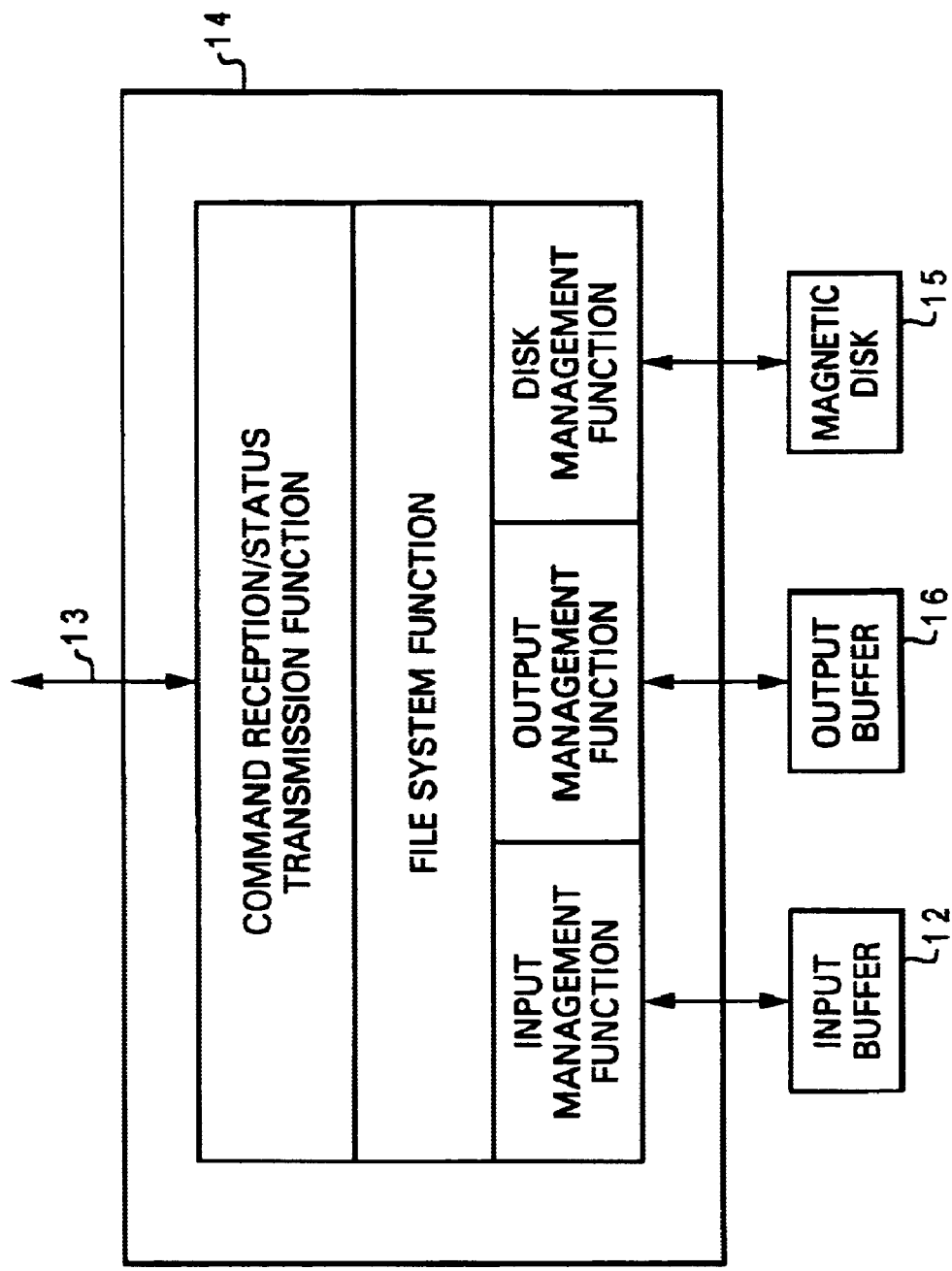
FIG. 2 depicts a diagram showing a configuration of a controller 14 incorporated in a hard disk drive 10 according to the embodiment of the present invention.

FIG. 1 is a block diagram showing a data recording and reproducing apparatus 10 according to an embodiment of the present invention. FIG. 2 illustrates details of a controller 14 thereof.

The data recording and reproducing apparatus 10 of this embodiment is an example applied to a hard disk drive. The hard disk drive 10 is composed of a magnetic disk 15, an input buffer 12 positioned on an input path 11, an output buffer 16 positioned on an output path 17, and a controller 14 positioned between the input and output buffers 12, 16 and the magnetic disk 15 by which a unit is constituted. As described above, however, the =hard disk drive 10 of, for example, an IDE type may be a unit corresponding to the magnetic disk 15. In that case, the input buffer 12, the output buffer 16 and the controller 14 constitute a control unit for the hard disk drive 10.

Input data transferred over the input path 11 is temporarily stored in the input buffer 12, and then transferred to and stored in the magnetic disk 15 under the control of the controller 14.

An example for implementing the input buffer 12 is next described. A data storage or memory area of the input buffer 12 is divided into two pages. At an initial stage, the input buffer begins to store the input data which is video data from a start address of a first page (hereinafter referred to as Page 0). When Page 0 is filled with the data, it is notified to the controller 14. When the controller 14 requests to deliver the data filled in Page 0, the input buffer 12 passes quickly the requested data to the controller 14. At the same time, the video data continuously transferred is stored in the input buffer 12 beginning from a start address of a a second page (hereinafter referred to as Page 1). When Page 1 is filled with the data, it is notified to the controller 14. When the controller 14 requests to deliver the data filled in Page 1, the input buffer 12 passes quickly the requested data to the controller 14. At the same time, the input buffer 12 stores the video data transferred thereto beginning from the start address of Page 0. These operations are repeated thereafter.

The operational procedure of the input buffer 12 described above can be realized by using hardware, and also by using software installed in the controller 14. With regard to the implementation of the input buffer 12, there exists other means for implementing equivalent functions such as the one using a circular buffer. Any input buffer using such implementing means is within the scope of the present invention. The above is also true for the output buffer 16 described below.

Next, the output buffer 16 will be described. The output buffer 16 stores temporarily output data which is video data from the magnetic disk 15, and transfers the output data through the output path 17. Basically, the output buffer 16 should have an FiFo buffer function as in the case of the input buffer 12. When the data temporarily stored in the input buffer 12 is to be output under the control of the controller 14, the output buffer 16 stores temporarily the output data or video data from the input buffer 12.

An example for implementing the output buffer 16 is next described. A data storage or memory area of the output buffer 16 is divided into two pages. At an initial stage, the output buffer 16 begins to store from a start address of Page 0 output data or video data transferred from the magnetic disk 15 under the control of the controller 14. When Page 0 is filled with the output data, the output buffer 16 begins to transfer the output data to the output path 17 beginning from the start address of Page 0 and notifies the controller 14 of completion of the receipt of the output data. At the same time, the output buffer 16 sequentially stores the video data continuously transferred, beginning from the start address of Page 1. When Page 1 is filled with the video data, the video data filled in Page 1 is transferred onto the output path 17 after all of the video data stored in Page 0 is transferred onto the output path 17. Concurrently, the output buffer 17 notifies the controller 14 that it is ready for receiving output data, and then the output buffer 17 stores sequentially video data next transferred beginning from the start address of Page 0. Thereafter, each time when the transfer of video data to the output path 17 is completed for each page, the receipt and transfer of video data are repeated by switching Page 0 and Page 1.

The following conditions must be satisfied as a premise for the implementation examples of the above described input and output buffers 12 and 16. Specifically, assuming that $t_1$ is a time required for writing video data into the magnetic disk 15 the amount of which is sufficient to fill Page 0 (or Page 1) of the input buffer 12, $T_1$ is a time required for filling Page 0 (or Page 1) of the input buffer 12 with video data, $t_2$ is a time required for reading out video data from the magnetic disk 15 the amount of which is sufficient to fill Page 0 (or Page 1) of the output buffer 16, and $T_2$ is a time required for completing the transfer of all video data filled in Page 0 (or Page 1) of the output buffer 16 onto the output path 17, then $t_1+t_2>T_1$ and $t_1+t_2>T_2$ must be satisfied. Specifically, $t_1+t_2>T_2$ means that writing a page of data from the input buffer 12 onto the magnetic disk 15 and reading a page of data from the magnetic disk 15 into the output buffer 16 are completed before Page 0 (or Page 1) of the input buffer 12 is filled with the video data. Similarly, $t_1+t_2>T_2$ means that writing a page of data from the input buffer 12 onto the magnetic disk 15 and reading a page of data from the magnetic disk 15 into the output buffer 16 are completed before the transfer of the video data filled in Page 0 (or Page 1) of the output buffer 16 is completed.

The command input/status output path 13 is an external communication path for transferring commands from the outside to the controller 14 and for supplying status and data management information from the controller 14 to outside.

Next, the functions of the controller 14 will be described.

As shown in FIG. 2, the controller 14 is provided with a command reception/status transmission function, a file system function, an input management function, an output management function and a disk management function. The controller 14 having the above-described functions controls the magnetic disk 15, the input buffer 12 and the output buffer 16 in response to the commands supplied from the outside through the command input/status output path 13.

The controller 14 manages data stored in the magnetic disk 15 by its file system function. Specifically, the data management of the controller 14 includes naming and storage area allocation for each data segment to be stored in the magnetic disk 15, deletion of stored data and release of its storage area, and inhibition of file deletion.

Typical commands supplied to the controller 14 through the command input/status output path 13 are illustrated in the diagram of FIG. 11. Some concrete operations performed in response to the commands are described below.

In response to the command "Read" supplied from the outside, the controller 14 determines by the file system function where in the magnetic disk 15 a specified file is stored physically, reads the file from the magnetic disk 15, and controls an output system comprising the output buffer 16 and the output path 17 to consecutively transfer the file.

In response to the command "Write" supplied from the outside, the controller 14 reserves a write area in the magnetic disk 15 by the file system function, and controls an input system comprising the input buffer 12 and the input path 11 to sequentially store input data consecutively transferred through the input system into the write area of the magnetic disk 15.

In response to the command "Directory" supplied from the outside, the controller 14 creates a list of data including file name, size and date/time of storage which are stored in the magnetic disk 15, and transfers them to the outside as status data.

Figure 5:
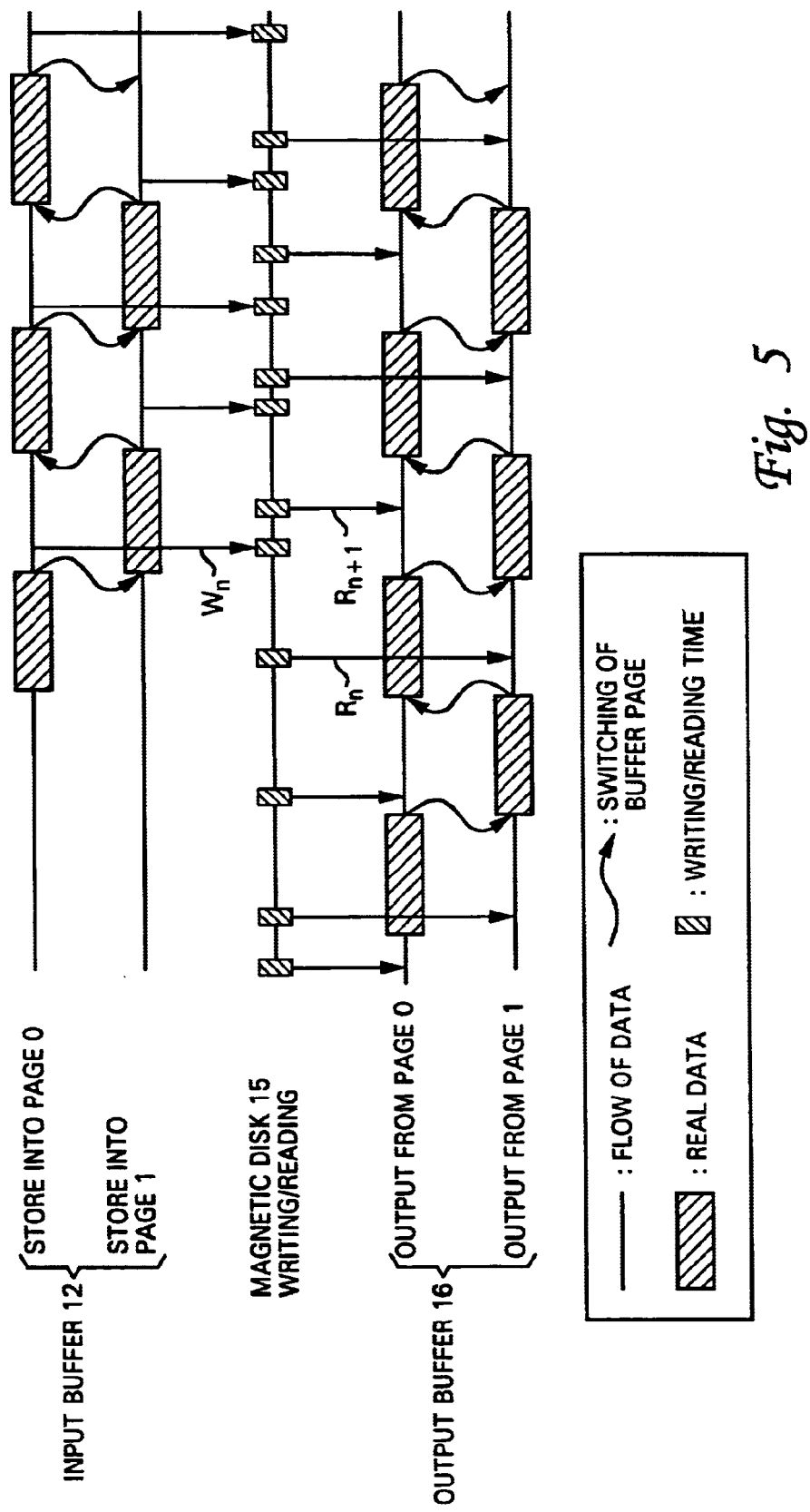
FIG. 5 depicts a timing chart of the reading and writing processes in the case where the reading process precedes the writing process.
Figure 6:
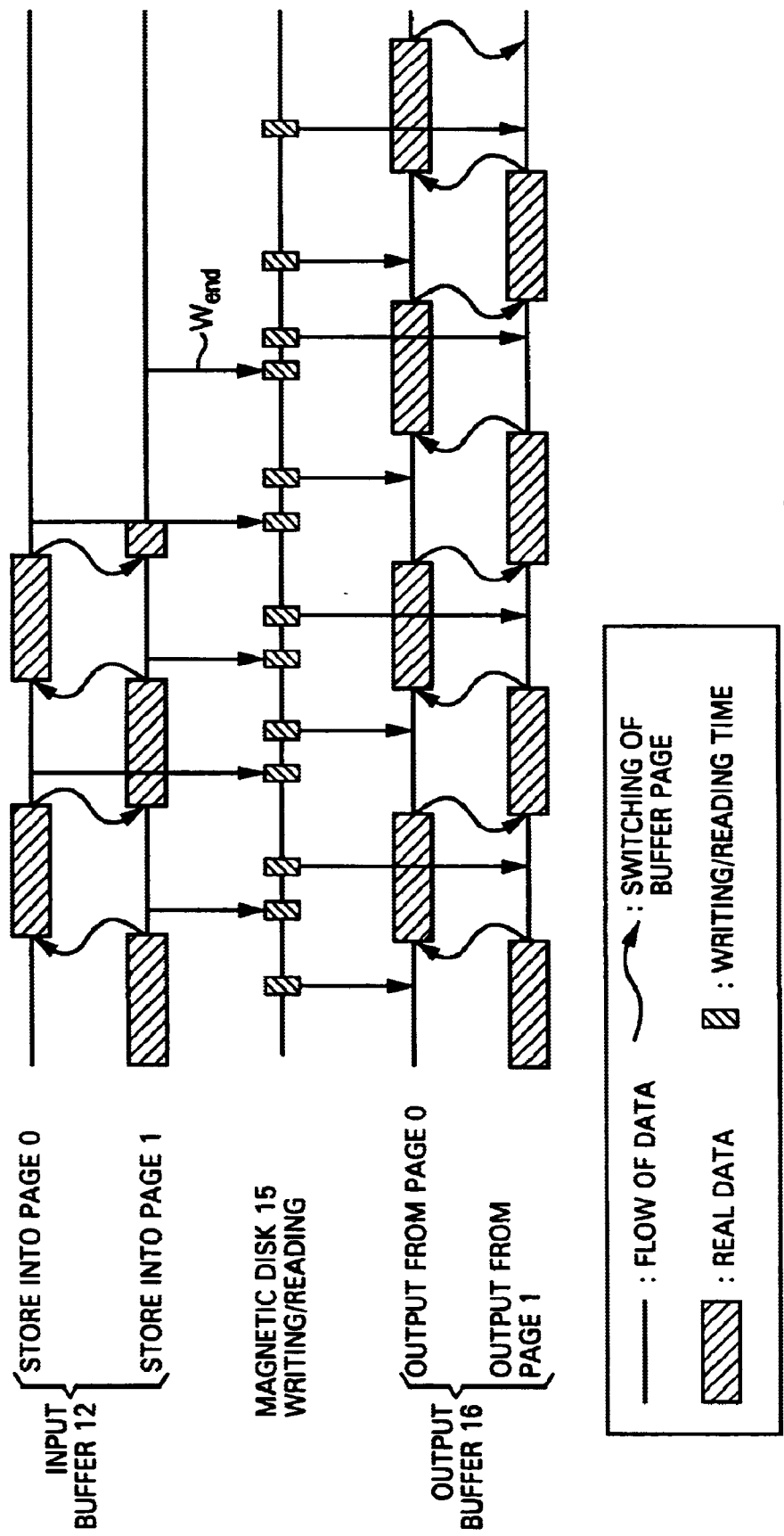
FIG. 6 depicts a timing chart in the case where the writing process is terminated from the regular states of the reading and writing processes.
Figure 7:
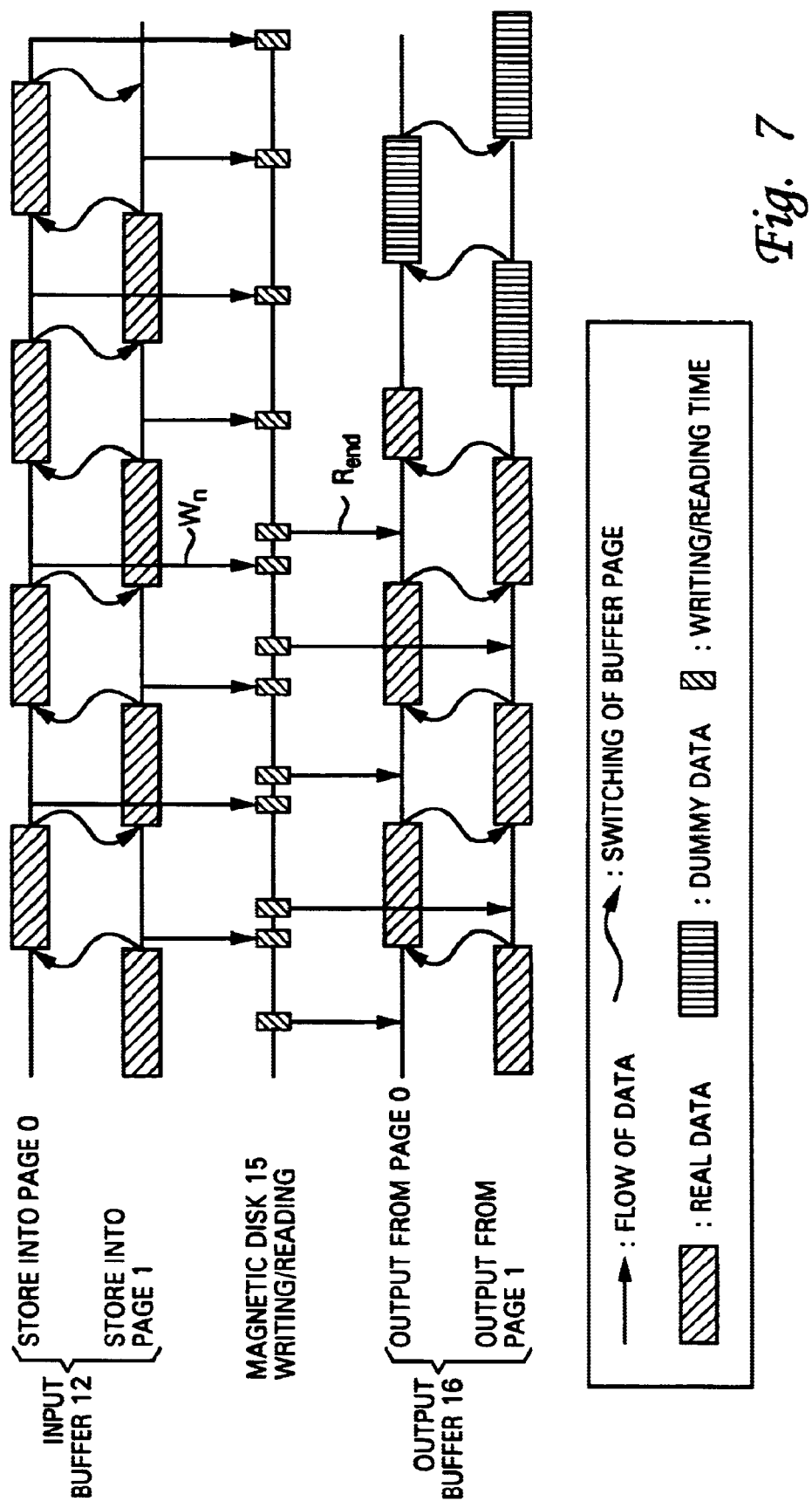
FIG. 7 depicts a timing chart in the case where the reading process is terminated from the regular states of the reading and writing processes.

Next, some examples of reading and writing processes for performing the simultaneous recording and reproducing will be concretely described based on timing charts shown in FIGS. 3 to 7. Described below are five cases which are a regular state of the reading and writing processes (FIG. 3), a second case where the writing process precedes the reading process (FIG. 4), a third case where the reading process precedes the writing process (FIG. 5), a fourth case where the writing process is terminated from the regular state (FIG. 6), and a fifth case where the reading process is terminated from the regular state (FIG. 7).

Figure 3:
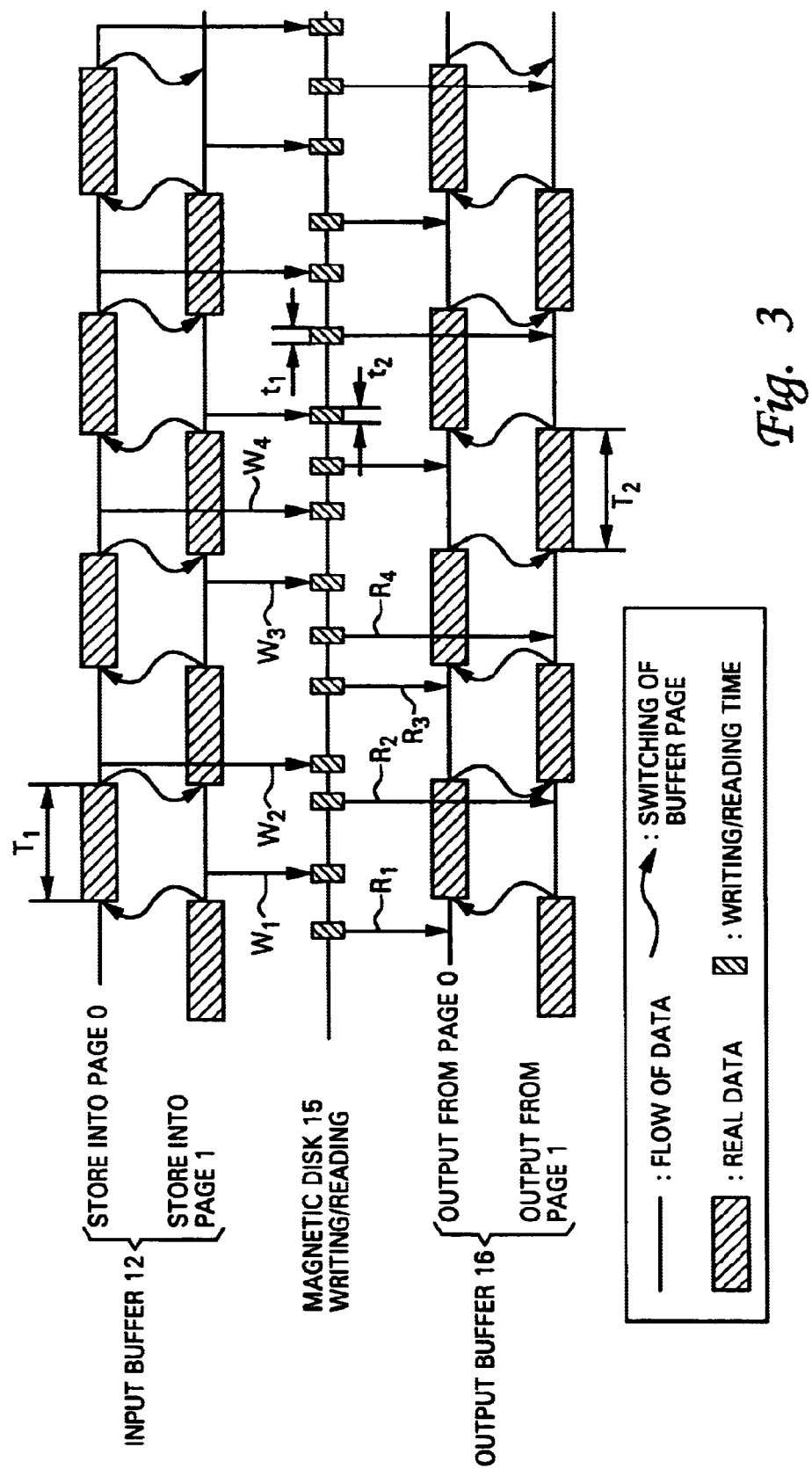
FIG. 3 depicts a timing chart for explaining regular states of reading and writing processes.

FIG. 3 is a timing chart where the reading and writing processes are in a regular state. In FIG. 3, video data R to be read comprises $R_1, R_2, R_3, R_4, \ldots$, and video data W to be written comprises $W_1, W_2, W_3, W_4, \ldots$.

The reading process is first described. In FIG. 3, a reading request is issued from the controller 14 to the magnetic disk 15 in which the video data R is stored. The video data $R_1$ is temporarily stored in Page 0 of the output buffer 16. When a preceding output from Page 1 of the output buffer 16 to the output path 17 is completed, the video data $R_1$ in Page 0 of the output buffer 16 is begun to be output to the output path 17, and the video data $R_2$ is read out from the magnetic disk 15 and temporarily stored in Page 1 of the output buffer 16. When the video data $R_1$ is completely output from Page 0 to the output path 17, the video data $R_2$ in Page 1 is begun to be output to the output path 17, and then the video data $R_3$ is read out from the magnetic disk 15 and temporarily stored in Page 0 of the output buffer 16. After the video data $R_2$ is completely output, the video data $R_3$ is output to the output path 17. These operations are repeated for the video data $R_4$ and the video data subsequent thereto. In this manner, the video data R recorded in the magnetic disk 15 can be continuously reproduced without omission by dividing the video data R into predetermined units such as $R_1, R_2, R_3, R_4, \ldots$, and sequentially reading them.

Next, the writing process is described. When the video data $W_1$ is stored in Page 1 of the input buffer 12 and Page 1 is filled with the video data $W_1$, the video data $W_1$ is written to the magnetic disk 15. At the same time, the video data $W_2$ continuously transferred is temporarily stored in Page 0 of the input buffer 12. When Page 0 of the input buffer 12 is filled the video data $W_2$, the video data $W_1$ is stored in the magnetic disk 15. These operations are repeated for the video data $W_3$ and the video data subsequent thereto, and thus the video data W constituting a program can be recorded continuously without omission by dividing the video data W into predetermined units such as $W_1, W_2, W_3, W_4, \ldots$, and sequentially recording them on the magnetic disk 15.

Next, the mixed reading and writing processes are described. While the video data $R_1$ read out from the magnetic disk 15 and temporarily stored in Page 0 of the output buffer 16 is being output and the input data is being stored in Page 0 of the input buffer 12, the video data $W_1$ stored in Page 1 of the input buffer 12 is written to the magnetic disk 15, and the video data $R_2$ is read out from the magnetic disk 15 and temporarily stored in Page 1 of the output buffer 16. Subsequently, while the video data $R_2$ temporarily stored in Page 1 of the output buffer 16 is being output therefrom and the input data is being stored in Page 1 of the input buffer 12, the video data $W_2$ stored in Page 0 of the input buffer 12 is written to the magnetic disk 15, and the video data $R_3$ is read out from the magnetic disk 15 and temporarily stored in Page 1 of the output buffer 16. In this manner, during outputting of video data from one page of the output buffer 16 and during storing of video data into one page of the input buffer, the other page of each of the input and output buffers 12 and 16 is used for reading from and writing to the magnetic disk 15 in which the reading and writing are controlled so as not to overlap with each other so that the video data W is recorded while the video data R is continuously reproduced. Note that the reading and writing may not be performed alternately. This can be understood from the order of reading $R_3$ and $R_4$ from the magnetic disk 15 and writing $W_3$ to the magnetic disk 15, as shown in FIG. 3. Namely, while the video data $R_3$ in the Page 0 area of the output buffer 16 is being output, reading of the video data $R_4$ should be completed. With respect to the writing, on the other hand, while the video data $W_4$ is being temporarily stored in the Page 0 area of the input buffer 12, writing of the video data $W_3$ should be completed. If the reading and writing do not overlap with each other, the simultaneous recording and reproducing can be done. Additionally, page switching of the input buffer 12 and the output buffer 16 may not performed simultaneously. Assuming that $t_1$ is a time required for writing the video data onto the magnetic disk 15 the amount of which is sufficient to fill Page 0 (or Page 1) of the input buffer 12, $T_1$ is a time required for filling Page 0 (or Page 1) of the input buffer 12 with the video data, $t_1$ is a time required for reading out the video data from the magnetic disk 15 the amount of which is sufficient to fill Page 0 (or Page 1) of the output buffer 16, and $T_2$ is a time required for completing transfer of all of the video data filled in Page 0 (or Page 1) of the output buffer 16 to the output path 17, then $t_1+t_2>T_1$ and $t_1+t_2>T_2$ should be always satisfied. Specifically, $t_1+t_2>T_1$ means that writing a page of data from the input buffer 12 onto the magnetic disk 15 and reading a page of data from the magnetic disk 15 to the output buffer 16 are completed before Page 0 (or Page 1) of the input buffer 12 is filled with the video data. Also, $t_1+t_2>T_2$ means that writing a page of data from the input buffer 12 onto the magnetic disk 15 and reading a page of data from the magnetic disk 15 to the output buffer 16 are completed before transfer of the video data filled in Page 0 (or Page 1) of the output buffer 16 is completed.

Figure 4:
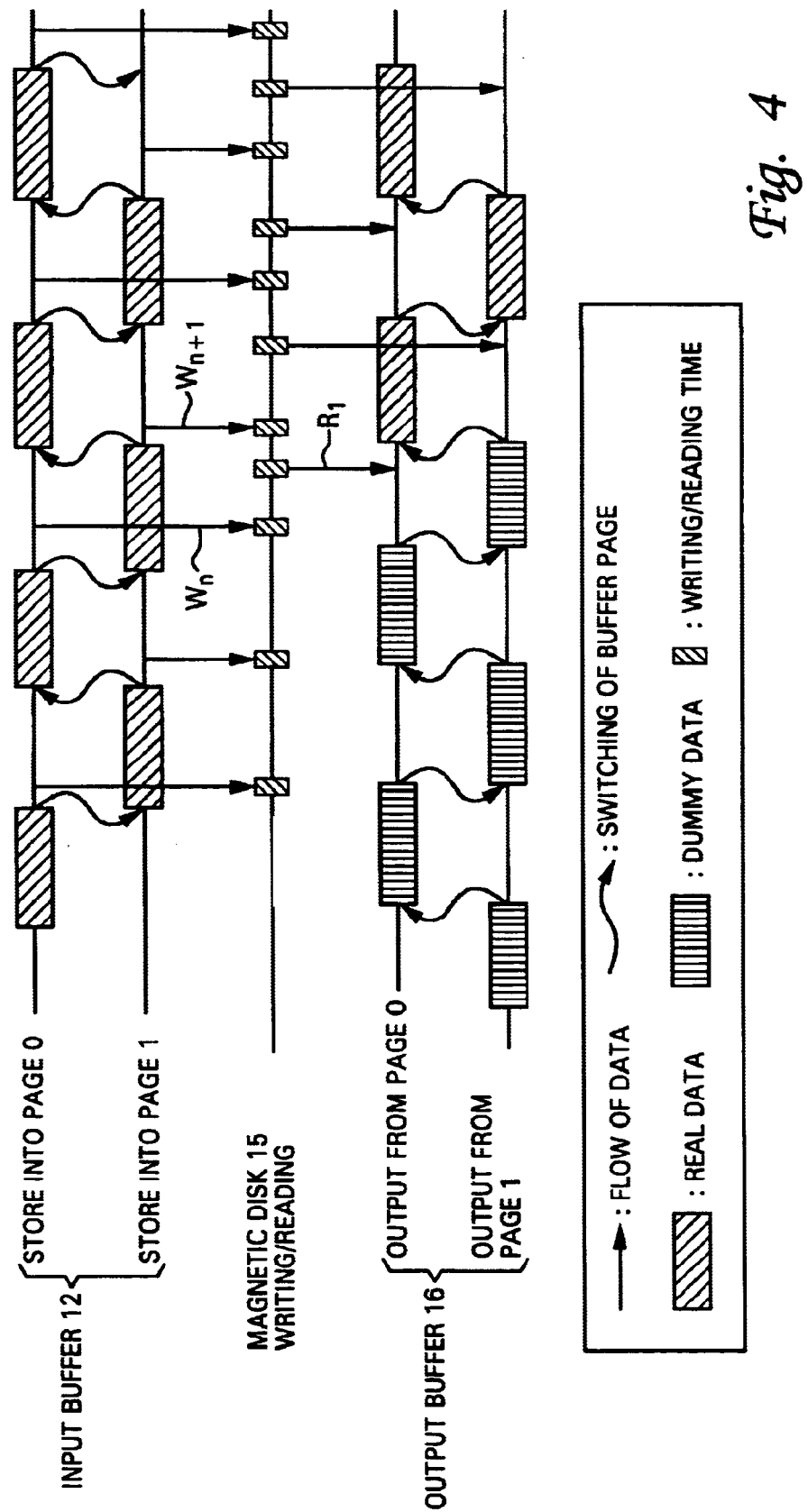
FIG. 4 depicts a timing chart of the reading and writing processes in the case where the writing process precedes the reading process.

Next, the case in which the writing process precedes the reading process will be described with reference to FIG. 4.

When the writing process is in progress, the reading process starts after the current writing to the magnetic disk 15 is completed and before a next writing request is issued so that the reading and writing of the magnetic disk 15 do not overlap with each other. Specifically, R, of the video data R stored in the magnetic disk 15 is read out and temporarily stored in Page 0 of the output buffer 16 after the video data $W_n$ stored in Page 0 of the input buffer 12 is completely written on the magnetic disk 15 and before the video data $W_{n+1}$ stored in Page 1 of the input buffer 12 is begun to be written onto the magnetic disk 15.

There may be no output before starting the reading process. However, dummy data such as a test pattern or logo may be output by supplying predefined data from the controller 14 to the output buffer 16.

Next, the case where the reading process precedes the writing process will be described with reference to FIG. 5.

When the reading process is in progress, the writing process to the magnetic disk 15 starts after the current reading of the magnetic disk 15 is completed and before a next reading request is issued so that the reading and writing of the magnetic disk 15 do not overlap with each other. Specifically, the writing of the video data W, stored in Page 0 of the input buffer 12 to the magnetic disk 15 starts after R, in the video data R written to the magnetic disk 15 is completely read out and before the reading of the next video data $R_{n+1}$ starts.

Next, the case where the writing process is terminated will be described with reference to FIG. 6.

Termination of writing may occur at any point of time. Accordingly, the end of written data scarcely aligns with the end of Page 0 (or Page 1) of the input buffer 12. It is, therefore, necessary to do padding or to add dummy data to fill a unit of writing of the magnetic disk 15 (sector size, for example, 512 bytes, 4096 bytes, etc.) or Page 0 (or Page 1) of the input buffer 12 in addition to the video data last written. The arrow shown by the video data $W_{end}$ in FIG. 6 indicates that writing to the magnetic disk 15 has been performed after the padding is done. The amount of dummy data to be added is adjusted to either a unit of writing of the magnetic disk 15 or a size of Page 0 (or Page 1) of the input buffer 12 depending on the implementation of the file system of the controller 14.

Finally, the case where the reading process is terminated will be described with reference to FIG. 7.

It is seen that the end of read data scarcely aligns with the end of Page 0 (or Page 1) of the output buffer 12. Accordingly, as shown in FIG. 7, after the video data $W_n$ is written from Page 0 of the input buffer 12 to the magnetic disk 15 and then the last video data $R_{end}$ in the video data R stored in the magnetic disk 15 is transferred to Page 0 of the output buffer 16, there may be no output or dummy data such as a test pattern or logo may be output by supplying predefined data from the controller 14 to the output buffer 16.

Figure 8:
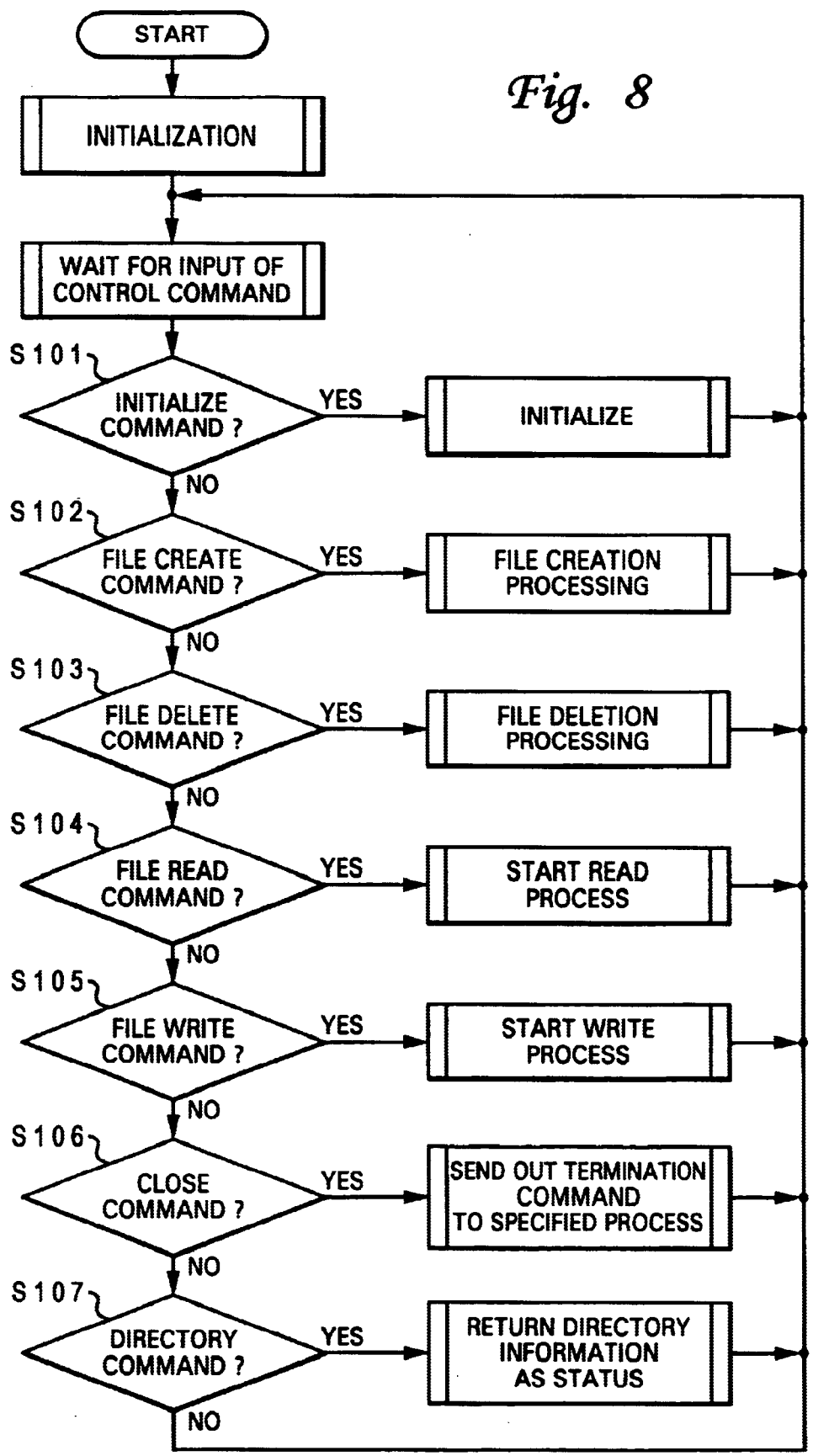
FIG. 8 depicts a control flow chart of the controller 14.
Figure 9:
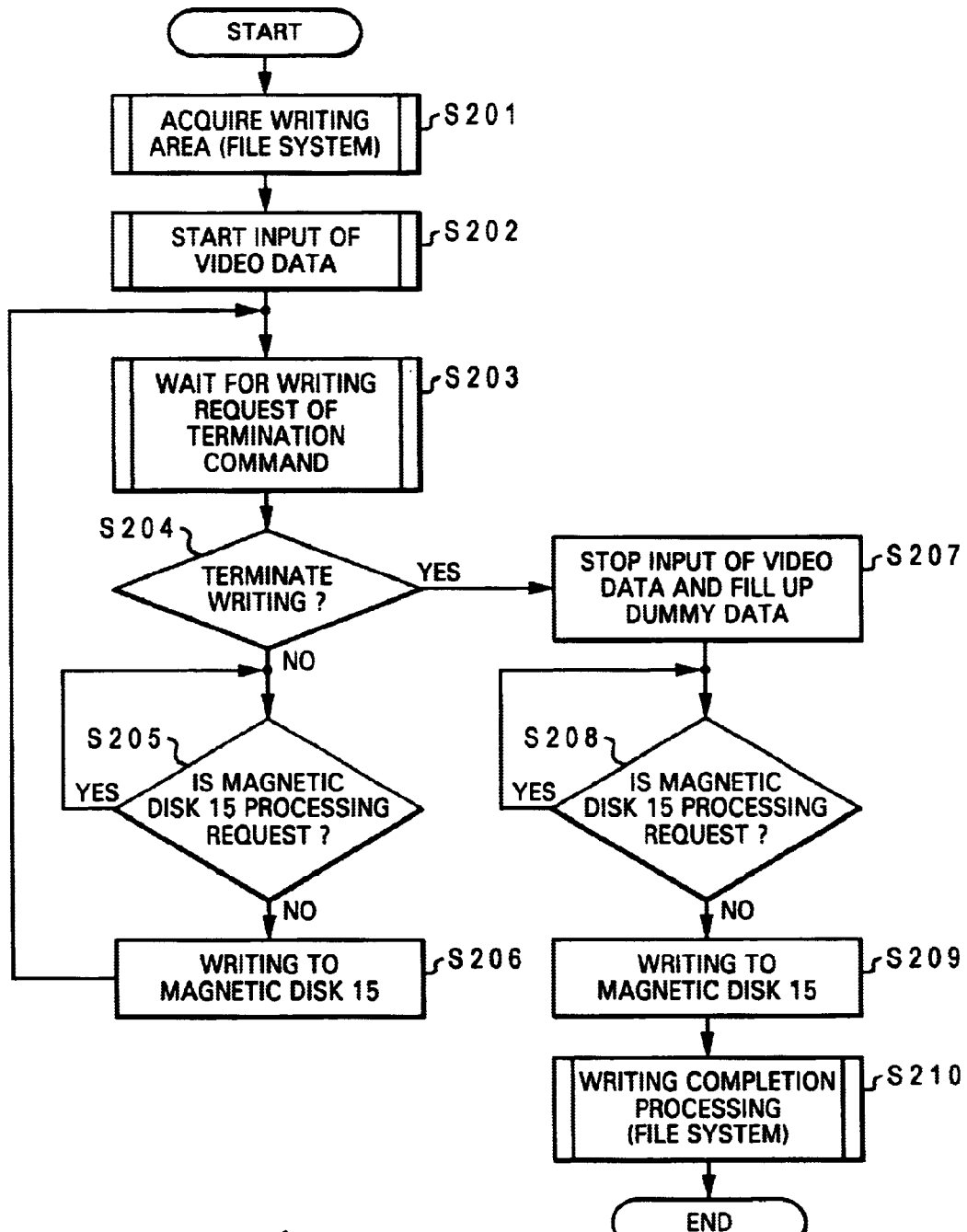
FIG. 9 depicts a flow chart for explaining the writhing process.
Figure 10:
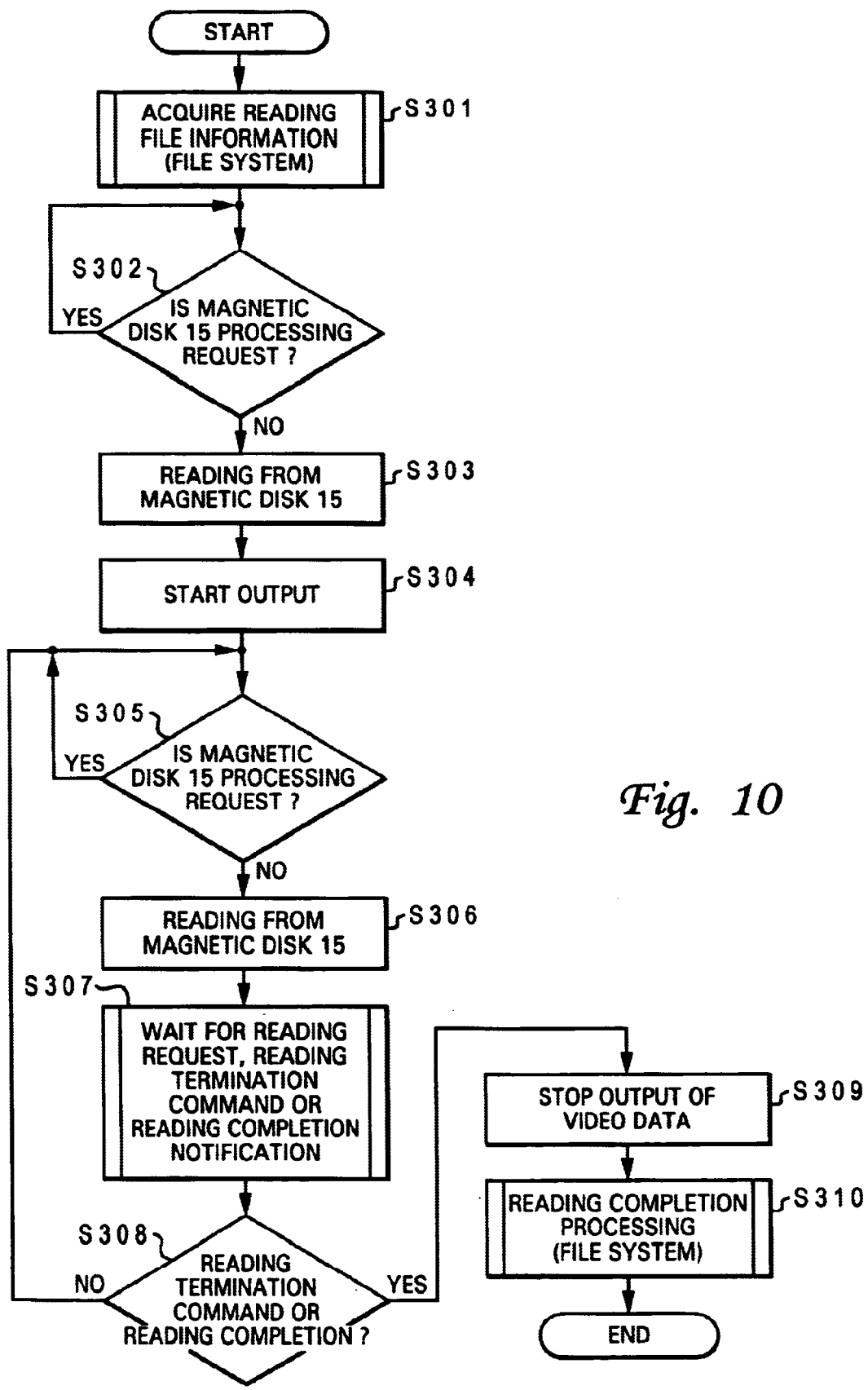
FIG. 10 depicts a flow chart for explaining the reading process.

FIGS. 8, 9 and 10 are a control flow chart of the controller 14, a flow chart for explaining the write process and a flow chart for explaining the read process, respectively. Details of these flow charts will be described below.

First, as shown in FIG. 8, in step 101 (shown as S101, the same rule applies to the rest), the controller 14 decides whether the control command is an initialize command. If the control command is the initialize command, the controller 14 initializes the magnetic disk 15. If the control command is not the initialize command, the controller 14 decides in step 102 whether the control command is a file create command. If the control command is the file create command, the controller 14 creates a new file in the magnetic disk 15. If the control command is not the file create command, the procedure proceeds to step 103, and the controller 14 decides whether the control command is a file delete command. If the control command is the file delete command, the controller 14 deletes a specified file. If the control command is not the file delete command, the controller 14 decides in step 104 whether the controller command is a file read command. If the control command is the file read command, the controller 14 start a read process. If the control command is not the read command, the controller 14 decides in step 105 whether the control command is a file write command. If the control command is the file write command, the controller 14 start a write process. If the control command is not the file write command, the controller 14 decides in step 106 whether the control command is a close command. If the control command is the close command, the controller 14 terminates reading or writing of a specified file by sending out a termination command to the specified process. In the case of the writing, data remaining in the input buffer 12 is stored in the magnetic disk 15. If the control command is not the close command, the controller 14 decides in step 107 whether the control command is a directory command. If the control command is the directory command, the controller 14 returns, as a status, directory information such as file name, file size, recording date/time and additional information.

In FIG. 9, the writing process starts and, in step 201, acquires a writing area on the magnetic disk 15 by a file system incorporated in the controller 14. Then, input of video data to the input buffer 12 is started in step 202. After the input is started, the controller 14 waits for a writing request for the magnetic disk 15 or a writing termination command in step 203, and decides in step 204 whether the command received is the writing termination command. If the command is not the writing termination command, the controller 14 confirms in step 205 whether the magnetic disk 15 is processing a request, that is, whether it is at a point between the reading request and the termination of the reading. If the magnetic disk 15 is not processing the request, the+controller 14 writes to the magnetic disk 15 in step 206. If the magnetic disk is processing the request, the controller 14 confirms again whether the magnetic disk 15 is processing the request. On the other hand, if the command is decided to be the writing termination command in step 204, the controller 14 stops inputting the video data to the input buffer and adds dummy data for padding in step 207. Next, in step 208, the controller 14 confirms whether the magnetic disk 15 is processing the request. If the magnetic disk 15 is not processing the request, the controller 14 writes to the magnetic disk 15 in step 209. Thereafter, a writing completion processing is performed by the file system in step 210, thus terminating a series of writing processings.

In FIG. 10, the reading process starts and, in step 301, acquires information concerning a file to be read out in the magnetic disk 15 by the file system incorporated in the controller 14. Next, in step 302, the controller 14 confirms whether the magnetic disk 15 is processing a request, that is, whether it is at a point between the writing processing request and the termination of the writing. If the magnetic disk 15 is not processing the request, the controller 14 reads from the magnetic disk 15 based on the above described file information in step 303, and outputs the read data from the output buffer 16 in step 304. Next, the controller 14 confirms in step 305 whether the magnetic disk 15 is processing the request. If the magnetic disk 15 is processing the request, the controller 14 waits. If the magnetic disk 15 is not processing the request, the controller 14 reads from the magnetic disk 15 in step 306. Thereafter, in step 307, the controller 14 waits for a reading request, a reading termination command or a reading completion notification. Next, in step 308, the controller 14 confirms whether the command is the reading termination command. If the command is not the reading termination command, the process returns to step 305. If the command is the reading termination command, the controller 14 stops outputting the video data from the output buffer 16 in step 309. Thereafter, the controller 14 performs the reading completion process by the file system in step 310, thus terminating a series of the reading processings.

Next, an example in which the hard disk drive 10 is applied to a digital video recorder system will be described with reference to FIG. 12. Since the hard disk drive 10 has already been described in detail, components other than the hard disk drive 10 will be described below.

Figure 12:
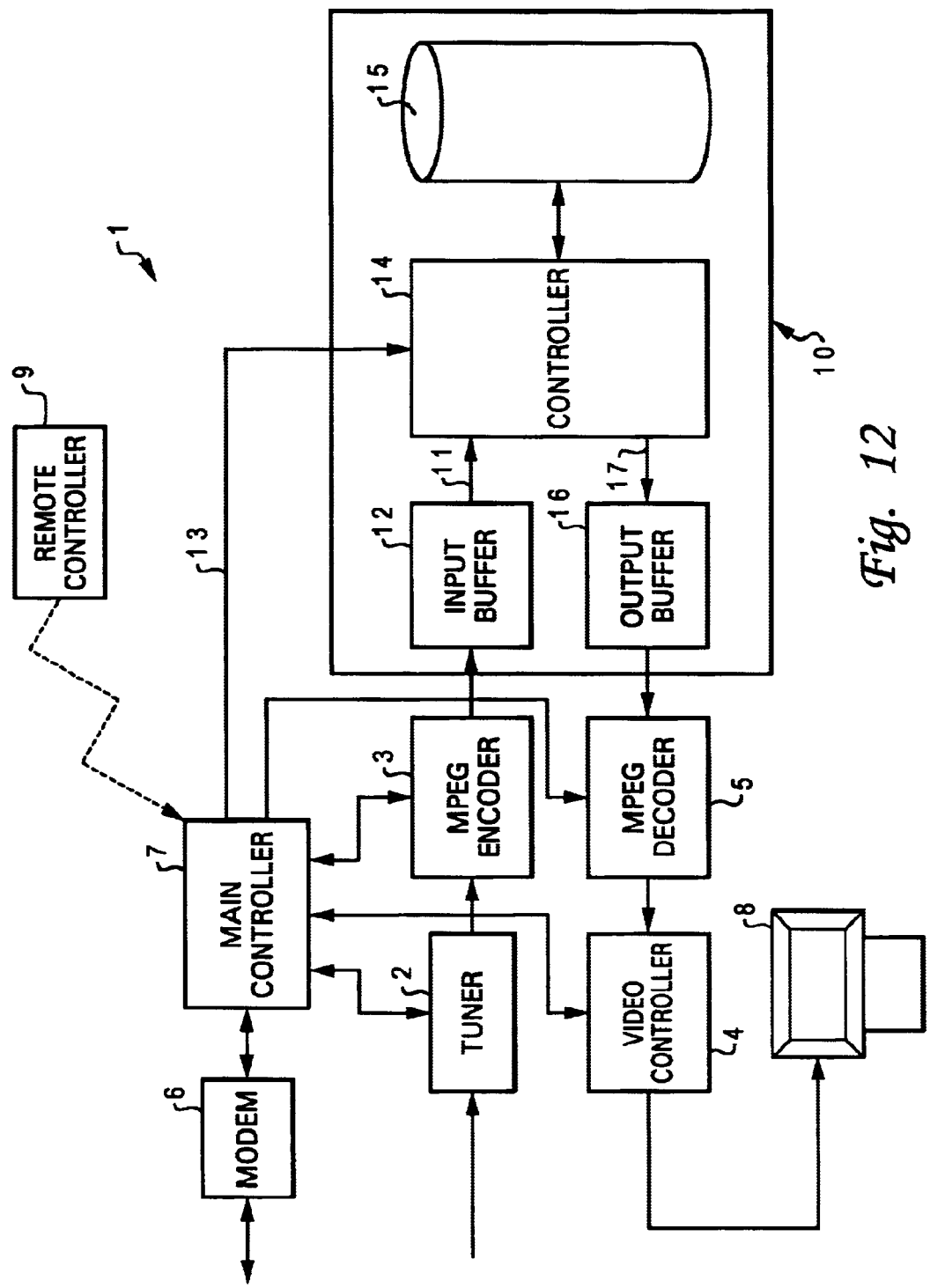
FIG. 12 depicts a block diagram showing a digital video recorder system to which the present invention can be applied.

As shown in FIG. 12, a digital video recorder system 1 is constituted by a tuner 2 and a MPEG (Moving Picture Experts Group) encoder 3 which are provided on the input path 11, a video controller 4 and a MPEG (Moving Picture Experts Group) decoder 5 which are provided on the output path 17, a hard disk drive 10, a modem 6, a main controller 7, a television receiver 8 and a remote controller 9.

The tuner 2 receives, for example, TV broadcast (program). The TV program is either analog broadcast or digital broadcast. In this embodiment, the analog broadcast is described although the present invention can also be applied to the digital broadcast. In the digital broadcast, the MPEG encoder 3 is not required because compressed signals are received.

The MPEG encoder 3 has a function to digitize analog signals and compress them. The MPEG decoder 5 has a function to expand the compressed video data, and the video controller 4 has a function of digital to analog conversion in addition to the conventional video controller function.

The main controller 7 controls the tuner 2, the MPEG encoder 3, the video controller 4, the MPEG decoder 5 and the controller 14 of the hard disk drive 10. The modem 6 is connected to the main controller 7. If an electronic program guide is provided, for example, on Internet, a viewer can automatically record his/her desired program via the modem 6 based on the electronic program guide.

The main controller 7 executes predetermined controls in response to the operation of the remote controller 9. The tuner 2 receives, for example, TV broadcast. In this embodiment, a TV program, that is, video data containing audio is assumed to be composed of analog signals as described above. When the viewer operates the remote controller 9 to record the TV program, the following recording process is executed. Specifically, the MPEG encoder 3 digitizes the analog signals and compresses them. The digitized video data is transferred over the input path 11, and stored in the input buffer 12 temporarily. The input data temporarily stored is transferred to and stored in the magnetic disk 15 under the control of the controller 14. The TV program is thus recorded. The specific details of the temporary storage of the input data in the input buffer 12, transfer of the input data to the magnetic disk 15 and storing of the input data in the magnetic disk 15 are described above.

When the viewer operates the remote controller 9 to reproduce a TV or other program recorded on the magnetic disk 15, the video data recorded on the magnetic disk 15 is output to the output buffer 16 under the control of the main controller 7 and the controller 14 of the hard disk drive 10. The video data temporarily stored in the output buffer 16 is expanded by the MPEG decoder 5 and transferred to the video controller 4. The video data is converted to an analog form in the video controller 4, and thereafter reproduced on the screen of the television receiver 8 under the control of the video controller 4. The specific details of transfer of the video data from the magnetic disk 15 to the output buffer 16, temporary storing of the video data in the output buffer 16, and output of the video data from the output buffer 16 are described above.

Since the above digital video recorder system 1 is provided with the hard disk drive 10 which is capable of performing simultaneous recording and reproducing, a TV program can be recorded while the recorded program is reproduced from any point. Also, a TV program can be recorded while a different program recorded on the magnetic disk 15 is reproduced.

As described above, according to the present invention, a data recording and reproducing apparatus which is capable of performing simultaneous recording and reproducing using a random-accessible recording device such as magnetic disk is provided. Also, the present invention provides a method for recording and reproducing video data which is suitable for such data recording and reproducing apparatus. Therefore, a program which a viewer desires to reproduce can be found in a short time, and the present invention satisfies viewer's needs that they want to record a TV program while watching the recorded program from any point, or that they want record a TV program while watching a different TV program previously recorded.

What is claimed is:

1. A data recording and reproducing apparatus comprising:
   a random-accessible recording device for storing data;
   an input path for transferring input data to said recording device;
   an input buffer disposed on said input path for temporarily storing said input data;
   an output path for transferring output data stored in said recording device, said output path being separate from said input path;
   an output buffer for temporarily storing the output data transferred through said output path; and
   a controller for simultaneously storing said input data into said input buffer and transferring said output data from said output buffer, in parallel with writing from said input buffer to said recording device or reading from said recording device to said output buffer, wherein each of said input buffer and said output buffer has a first memory area and a second memory area, and $t_1+t_2>T_1$ and $t_1+t_2>T_2$ are satisfied where $t_1$ is a time required for writing data into said recording device the amount of which is sufficient to fill the first or second memory area of said input buffer $T_1$ is a time required for filling the first or second memory area of said input buffer with data, $t_2$ is a time required for reading out data from said recording device the amount of which is sufficient to fill the first or second memory area of said output buffer, and $T_2$ is a time required for completely outputting the data filled in the first or second memory area of said output buffer.

2. The data recording and reproducing apparatus according to claim 1, wherein said controller is positioned between said input and output buffers and said recording device and performing said storing, said transferring, said writing, and said reading, in response to commands from the outside.

3. The data recording and reducing apparatus according to claim 2, wherein a path used for command input and status output is connected to said controller, separately from said input path and said output path.

4. A method for recording and reproducing video data in which the video data is recorded in a random-accessible recording device having separate input and output buffers and the video data recorded in said recording device is reproduced, said method comprising the steps of:

storing the video data from the outside into said input buffer, writing the video data stored in said input buffer to said recording device;

reading out the video data recorded in said recording device to said output buffer, and transferring the video data read out to said output buffer to the outside simultaneously with said storing step wherein each of slid mat buffer and said output buffer has a first memory area and a second memory area, and $t_1+t_2>T_1$ and $t_1+t_2>T_2$ are satisfied where $t_1$ is a time required for writing data into said recording device the amount of which is sufficient to fill the first or second memory area of said input buffer, $T_1$ is a time required for filling the first or second memory area of said input buffer with data $t_2$ is a time required for reading out data from said recording device the amount of which is sufficient to fill the first or second memory area of said output buffer and $T_2$, is a time required for completely outputting the data filled in the first or second memory area of said output buffer.

5. A disk drive unit comprising a hard disk for storing data;

an input path for transferring input data to said hard disk;

an output path for outputting data stored in said hard disk, said output path being separate from said input path; and a file system disposed between said input and output paths and said hard disk for managing data stored in said hard disk, wherein each of said input buffer and said output buffer has a first memory area and a second memory area, and $t_1+t_1>T_1$ and $t_1+t_2>T_2$ are satisfied where $t_1$ is a time required for writing data into said hard disk the amount of which is sufficient to fill the first or second memory area of said input buffer, $T_1$ is a time required for filling the first or second memory area of said input buffer with data $t_2$ is a time required for reading out data from said hard disk the amount of which is sufficient to fill the first or second memory area of said output buffer and $T_2$ is a time required for completely outputting the data filled in the first or second memory area of said output buffer.

6. The disk drive unit according to claim 5, wherein an input buffer is disposed on said input path, an output but is disposed on said output path, and a controller for controlling said input buffer and said output buffer is provided between said input and output buffers and said hard disk.

7. The disk drive unit according to claim 6, said file system is built in said controller.

8. The disk drive unit according to claim 7, wherein said controller stores data into said input buffer and transfers data from said output buffer simultaneously, in parallel with writing from said input buffer to said hard disk or reading from said hard disk to said output buffer.

9. A data recording and reproducing apparatus comprising:

a random-accessible recording device for storing data;

an input path for transferring input data to said recording device;

an input buffer disposed on said input path for temporarily storing said input data;

an output path for transferring output data stored in said recording device, said output path being separate from said input path;

an output buffer for temporarily storing the output data transferred through said output path; and a controller for simultaneously storing said input data into said input buffer and transferring said output data from said output buffer, in parallel with writing from said input buffer to said recording device or reading from said recording device to said output buffer, where said operations of writing to and reading from said recording device are performed by a single read/write head using data supplied from and to said respective input and output buffers.

10. The data recording and reproducing apparatus according to claim 9, wherein said contoller is positioned between said input and output buffers and said recording device and performing said storing, said transferring, said writing, and said reading, in response to commands from the outside.

11. The data recording and reproducing a apparatus according to claim 10, wherein a path used for command input and status output is connected to said controller, separately from said input path and said output path.

12. The data recording and reproducing apparatus according to claim 9, wherein each of said input buffer and said output buffer has a first memory area and a second memory area, and $t_1+t_2>T_1$ and $t_1+t_2>T_2$ are satisfied where $t_1$ is a time required for writing data into said recording device the amount of which is sufficient to fill the first or second memory area of said input buffer, $T_1$ is a time required for filling the first or second memory area of said input buffer with data, $t_2$ is a time required for reading out data from said recording device the amount of which is sufficient to fill the first or second memory area of said output buffer, and $T_2$ is a time required for completely outputting the data filled in the first or second memory area of said output buffer.

* * * * *

UNITED STATES PATENT AND TRADEMARK OFFICE
CERTIFICATE OF CORRECTION

PATENT NO. : 7,050,705 B1
APPLICATION NO. : 09/675543
DATED : May 23, 2006
INVENTOR(S) : Kazuaki Mori It is certified that error appears in the above-identified patent and that said Letters Patent is hereby corrected as shown below:

At column 5, line 2, delete "writhing" and insert --writing--.

In Claim 3, at column 13, line 4, delete "reducing" and insert --reproducing--.

In Claim 4, at column 13, line 21, delete "slid mat" and insert --said input--.

In Claim 4, at column 13, line 28, delete "data" and insert --data,--.

In Claim 4, at column 13, line 31, delete "and" and insert --and,--.

In Claim 5, at column 13, line 49, delete "data" and insert --data,--.

In Claim 5, at column 13, line 52, delete "and" and insert --data,--.

In Claim 6, at column 13, line 56, delete "but" and insert --buffer--.

In Claim 7, at column 14, line 4, after "6," and before "said" insert --wherein--.

Signed and Sealed this

Sixth Day of February, 2007

JON W. DUDAS
*Director of the United States Patent and Trademark Office*